Sept. 13, 1932.　　　D. T. BROWNLEE　　　1,877,486

ANTIFRICTION JOURNAL BEARING

Filed Feb. 8, 1930

INVENTOR:

Dalmar T. Brownlee,

BY

E. T. Silvius.

ATTORNEY.

Patented Sept. 13, 1932

1,877,486

UNITED STATES PATENT OFFICE

DALMAR T. BROWNLEE, OF INDIANAPOLIS, INDIANA

ANTIFRICTION JOURNAL BEARING

Application filed February 8, 1930. Serial No. 426,930.

This invention relates to the type of anti-friction journal bearing that has rolling load-supporting contacts, the invention having reference more particularly to a journal bearing having provision for supporting a load rotatably and provision also for resisting end thrust, all as a unitary structure.

An object of the invention is to provide an anti-friction bearing that shall be of such construction as to be adapted to be used instead of two separate bearing units in situations where heavy radial loads and also axial loads must be borne.

Another object is to provide a unitary plural-function rolling-contact journal bearing which shall be of such construction as to be simple and inexpensive to manufacture and yet be highly efficient in operation.

A further object is to provide a compact anti-friction journal bearing of large radial and thrust capacity that is convenient to handle and adapted to be manufactured in sizes interchangeable with anti-friction bearings now in common use.

A still further object is to provide an anti-friction journal bearing that is durable and economical in use under severe conditions as exist in the wheels, axles, propeller shafts, and worm shafts of motor cars, aeroplanes, etc.

With the above-mentioned and other objects in view, the invention consists in a novel assembly of cylindrical bearing rollers and spherical bearing balls and a novel cage or retainer therefor, and in improved race devices for the rollers and the balls; the invention consisting also further in the parts and combinations and arrangements of parts as hereinafter particularly described and set forth in the claims appended hereto.

Figure 1:
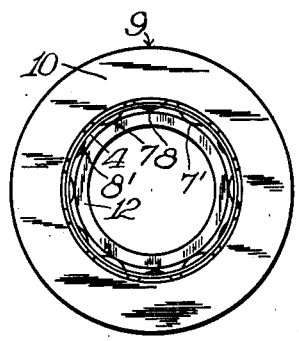
Figure 3:
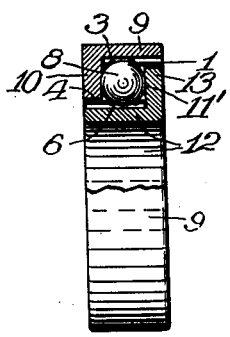
Figure 2:
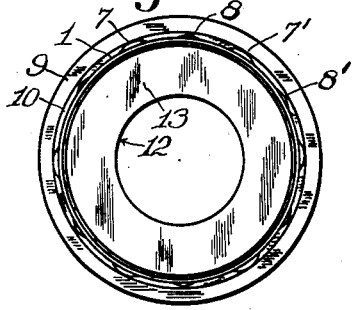
Figure 4:
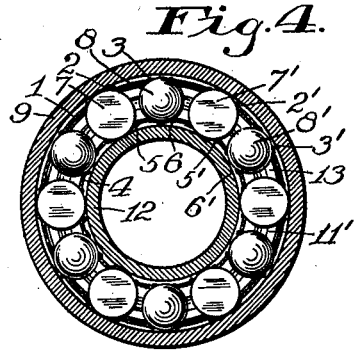
Figure 5:
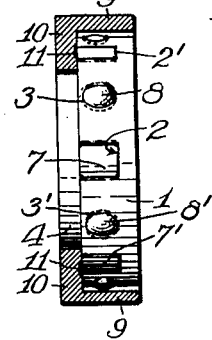
Figure 6:
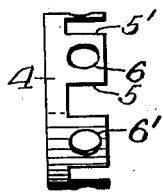
Figure 7:
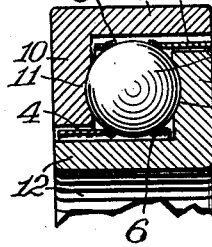
Figure 8:
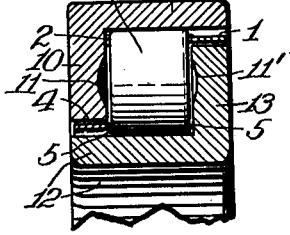

Referring to the accompanying drawing,—Figure 1 is a plan view of one side, and Fig. 2 is a plan view of the opposite side of the improved journal bearing as preferably constructed; Fig. 3 is a peripheral view partially in cross-section; Fig. 4 is a plan view of the arrangement of the bearing rollers and balls in the race members and retainers shown in central section; Fig. 5 is a peripheral view of the retainers with rollers and balls therein shown as arranged in the outer one of the races; Fig. 6 is a peripheral view of the inner one of the parts of the retainer; Fig. 7 is a cross-sectional view of the race members and the retainer with a bearing ball therein; and Fig. 8 is a cross-sectional view of the race members and the retainer with a bearing roller therein.

Similar reference characters in the different figures of the drawing indicate corresponding elements or features of construction herein referred to in detail.

In a practical embodiment of the invention a two-part cage is provided which constitutes retaining means as well as spacing devices. The cage has an outer ring 1 in the form of a hollow cylinder having a thin wall, preferably composed of slightly elastic metal, the wall having a plurality of openings or slots 2 and 2' spaced apart and also a plurality of circular openings 3 and 3' intermediately of the slots. The cage preferably has also an inner ring 4 also in the form of a hollow cylinder of relatively smaller diameter than the outer ring and having openings or slots 5 and 5' spaced apart adjacent to one edge thereof and having also circular guide openings 6 and 6' intermediately of the slots. Cylindrical bearing rollers 7 and 7' are arranged in the slots of the two rings, and bearing balls 8 and 8' are arranged in the circular openings in the two rings, the balls being slightly less diametrically than the rollers. The metal of the retaining rings preferably have short lips to afford ample bearing contact with the rollers and the balls which might otherwise be too limited because of thin edges resulting from the use of rings having thin walls. The assembly is readily effected by springing the rings so as to admit the balls after the rollers are slipped into their places, and thus the parts are held together and may be conveniently handled and applied to such housing or race members as may be desired.

Preferably a cylindrical outer race member 9 is provided in which the rollers have rolling contact, the member having an inwardly extending annular end thrust plate 10 having a ball race groove 11 in which the balls have contact. Also an inner race member 12 is provided which is cylindrical for contact with the rollers and has an outwardly extending flange-like annular end thrust bearing plate 13 on one end thereof which is parallel to the plate 10 and has a race groove or channel 11' in its inner face, the balls being guided in the grooves or channels 11 and 11' and running clear of the members 9 and 12. The internal diameter of the annular plate 10 is greater than the external diameter of the race member 12, affording clearance space to receive the continuous portion of the ring 4, and the external diameter of the plate 13 is less than the internal diameter of the member 9 affording clearance space receiving the continuous portion of the ring 1, so that the cage may turn without frictional contact with the housing parts.

The race member 9 may be secured in a wheel hub or may be stationarily secured in such place as may be desired. And correspondingly the race member 12 may be suitably secured to an axle or to a rotary shaft as may be required.

In practical use the rollers are in bearing contact with the race members 9 and 12 and slightly clear the plates 10 and 13, so that the load is rotatively supported by rolling contact with negligible frictional resistance in the retaining rings. End thrust or load is borne by the balls and the thrust bearing plates 10 and 13 without any serious frictional resistance.

What is claimed is:

1. In an anti-friction journal bearing, a retaining cage including an outer spacing ring and a diametrically smaller inner spacing ring to rotate in unison, each ring having roller-retaining slots in one edge portion thereof and the rings arranged reversely each relatively to the other, to radially position cylindrical bearing rollers and enable the rings to co-operate to retain all the rollers on one and the same plane of rotation.

2. In an anti-friction journal bearing, the combination of an outer cage ring and an inner cage ring concentrically arranged to rotate in unison and having each a plurality of roller-retaining slots intersecting one edge thereof, each ring having also intermediate ball-retaining openings adjacent to said edge, said edges being on opposite sides respectively of the plane of rotation of the ball-retaining openings, cylindrical bearing rollers retained in said slots, and spherical bearing balls retained in said openings.

3. In an anti-friction journal bearing, the combination of a pair of concentric race rings having each an annular side plate integral therewith, each plate having a circular groove in its inner face, the plates being oppositely arranged, a cage comprising elastic continuous cylindrical outer and inner rings having each a plurality of slots and also a plurality of circular openings alternately arranged, cylindrical bearing rollers retained in the slots between the race rings, and balls diametrically smaller than the rollers retained in the circular openings between the side plates to operate in said grooves.

4. In an anti-friction journal bearing, a cage comprising an elastic outer ring and an elastic inner ring, each ring being continuous and cylindrical and having each a series of roller-retaining slots intersecting one edge thereof and having also a series of circular ball-retaining openings, the rings being reversed in arrangement and adapted to be connected together by balls in said openings.

In testimony whereof, I affix my signature on the 4th day of February, 1930.

DALMAR T. BROWNLEE.